(12) United States Patent
Risan (10) Patent No.: US 8,407,808 B2
(45) Date of Patent: Mar. 26, 2013

(54) SECURITY THREAD FOR PROTECTING MEDIA CONTENT

(75) Inventor: Hank Risan, Santa Cruz, CA (US)

(73) Assignee: Media Rights Technologies, Inc., Santa Cruz, CA (US)

( * ) Notice: Subject to any disclaimer, the term of this patent is extended or adjusted under 35 U.S.C. 154(b) by 242 days.

(21) Appl. No.: 12/788,998

(22) Filed: May 27, 2010

(65) Prior Publication Data

US 2011/0296534 A1    Dec. 1, 2011

(51) Int. Cl.
*G06F 17/30* (2006.01)
(52) U.S. Cl. .......................................... 726/30
(58) Field of Classification Search ................. None
See application file for complete search history.

(56) References Cited

U.S. PATENT DOCUMENTS

| 2005/0018854 A1 | 1/2005 | Yamamoto et al. |
| 2007/0112676 A1* | 5/2007 | Kontio et al. ................. 705/50 |
| 2008/0289050 A1 | 11/2008 | Kawamoto et al. |

FOREIGN PATENT DOCUMENTS

| JP | 2002/369154 | 12/2002 |
| WO | WO-00/54453 | 9/2000 |

OTHER PUBLICATIONS

"ISA/US", International Search Report and Written Opinion for Application No. PCT/US2011/037807, (Jan. 18, 2012),15 pages.

* cited by examiner

*Primary Examiner* — Brandon Hoffman (57) ABSTRACT

Disclosed herein is a system and method for protecting copyrighted media content. The copyright and playback management information is embedded into at least one data field of the media content. The media content is then encoded for a serial copy management system (SCMS) that utilizes the copyright and playback management information to ensure the appropriate copyright protection of the media content based at least in part on the embedded copyright and playback management information.

21 Claims, 7 Drawing Sheets

SECURITY THREAD FOR PROTECTING MEDIA CONTENT

FIELD

Embodiments of the present technology relates generally to the field of protection of media content.

BACKGROUND

In general, media content may include audible, visual, or a combination thereof. For example, audio media may be a recording such as a speech, song, sound effect, chime, alarm, or the like which may be presented in an audible manner. A visual media may be a photograph, page of text, block of text, single word, image, or other static or dynamic object that may be presented in a visual manner. The visual method for display may be a graphic user interface (GUI), or the like. A combination of audio/visual may include static or dynamic visual media that is in some way associated with audio media. One example of audio/visual media is a movie. Another example would be a slideshow with an associated text or audio recording.

Presently, the Internet is replete with web pages and other media content that may include audio, visual, and combinations thereof. For example, a web page may include a photo (visual media), a logo (visual media), a sound file (audio media), text (visual media), etc. Similarly, the web page may include a link to an audio file, such as an MP3 file, and/or a video file such as a photograph, slideshow, text document, and the like. Further, the web page link may include an audio-video file such as a movie file, etc.

In many cases, the media content will include some type of copyright protection. Basically, the copyright protection allows the owner of the copyrighted media content to control distribution of the media content and receive the proper copyright royalties for the use of the copyright protected media content. For example, if the media content is copyright protected, copyright royalties may be required by anyone copying, transmitting or subsequently downloading the protected media content. In another example, the media content may be copyright protected and the owner may not want another to download, copy or distribute the media content.

SUMMARY

Disclosed herein is a system and method for utilizing a security thread for protecting copyrighted media content. The copyright and playback management information security thread is embedded into at least one data field of the media content. The media content is then encoded for a serial copy management system (SCMS) that utilizes the copyright and playback management information to ensure the appropriate copyright protection of the media content based at least in part on the embedded copyright and playback management information.

BRIEF DESCRIPTION OF THE DRAWINGS

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

In overview, without utilizing a technological measure to protect copyrighted media, proof of violation of one or more copyright laws is difficult to accomplish. In other words, without a technological measure in place, it is hard to make a convincing argument that a copyright has been violated when no measures have been taken to protect it. In contrast, a section 12 violation "circumventing a technological measure to protect copyright" is much easier to prove and therefore more enforceable. Further, a section 12 violation is a clearly defined dollar minimum per device fine. For example, the present utilization of a security thread such as altering or removing the fine could be a 2,500.00 dollar fine.

By utilizing the technology described herein, that is, by using embedded security technological measures to control access to the work, the owner of the copyright or the service providing the copyrighted material is clearly taking affirmative measures to protect the copyright. As such, section 12 of the copyright act is invoked. In other words, the technology described herein is a direct method by which copyright can be preserved.

The following discussion begins with a description of a copyright compliance mechanism (CCM) and a number of embodiments for providing copyright information with the media content. The discussion then discusses the presentation and protection of the media content and ends with a description of a computer system upon which one or more of the discussed embodiments may be utilized, stored or input thereto.

Copyright Compliance Mechanism

Figure 1:
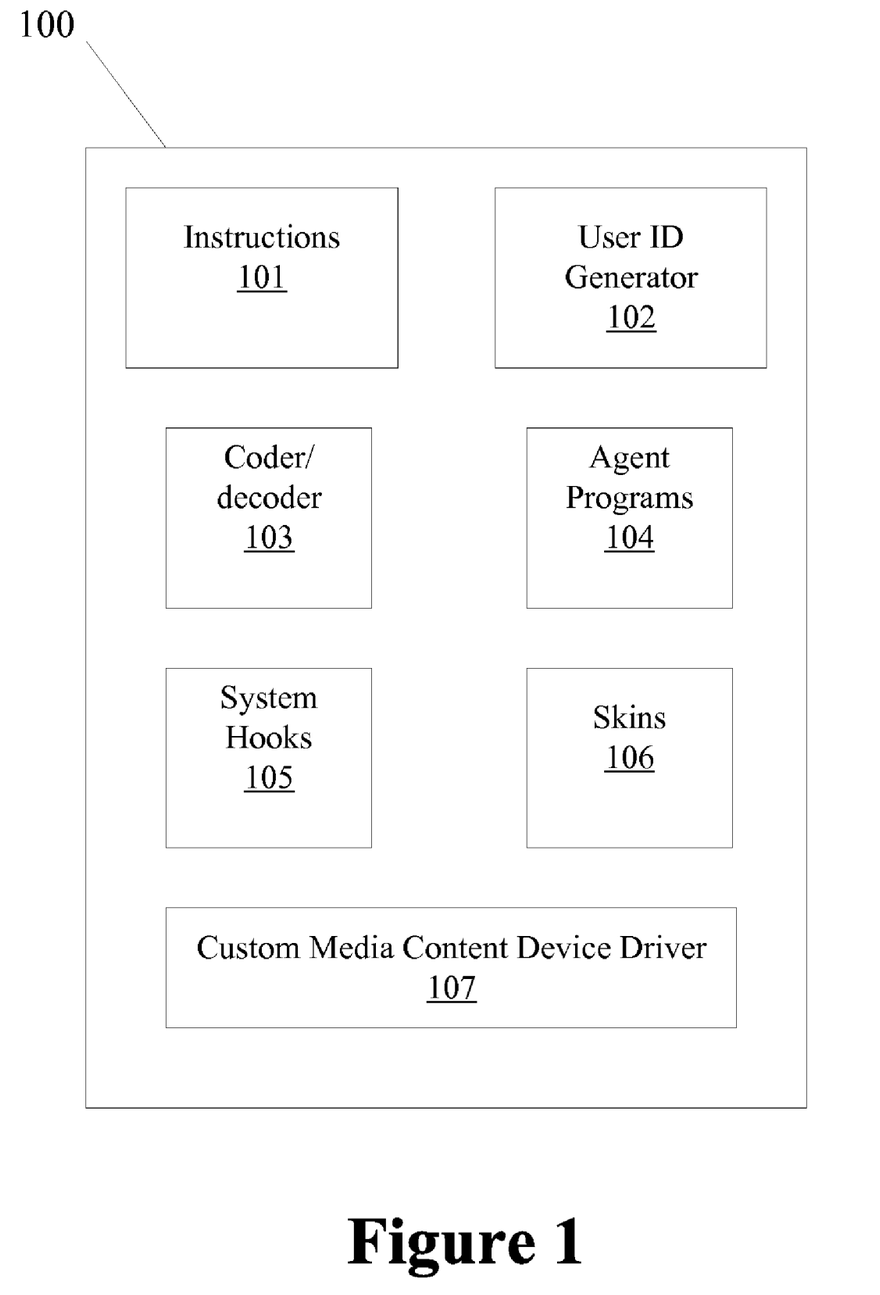
FIG. 1 is a block diagram of various exemplary functional components of a copyright compliance mechanism (CCM) in accordance with an embodiment of the present invention.

FIG. 1 is a block diagram of an exemplary copyright compliance mechanism (CCM) 100, for controlling distribution of, access to, and/or copyright compliance of media content files, in accordance with an embodiment of the present invention. In one embodiment, CCM 100 contains one or more software components and instructions for enabling compliance with DMCA (digital millennium copyright act) restrictions and/or RIAA (recording industry association of America) licensing agreements regarding media content files. In one embodiment, although copyright is used in the description, another type of usage protection including copy, transfer or playback limitations may also be utilized herein. In other words, in one embodiment, the present technology is well suited for numerous types of usage protection including, but not limited to, copyright protection. In general, the usage protection allows the owner of the usage restricted media content to control distribution of the media content.

In one embodiment, CCM 100 is installed into each client computer system. Alternatively, CCM 100 can be, in another embodiment, externally disposed and communicatively coupled with a client computer system. In one embodiment, portions of components, entire components and/or combinations of components of CCM 100 can be readily updated to reflect changes or developments in the DMCA, changes or developments in copyright restrictions and/or licensing agreements that pertain to any media content file, changes in current media content player applications and/or the development of new media content player applications.

Referring to FIG. 1, in one embodiment, CCM 100 is shown to include instructions 101 for enabling a client computer system to interact with a web server or content server on a network. CCM 100 also includes, a user ID generator 102, for generating a user ID or user key, and one or more cookie(s) which contain(s) information specific to the user and the user's computer system. In one embodiment, the presence of a valid cookie(s) and a valid user ID/user key are verified by a web server before the remaining components of a CCM 100 can be installed. Additionally, the user ID/user key can contain, but is not limited to, the user's name, the user's address, the user's credit card number, verified email address, and an identity (username) and password selected by the user. Furthermore, the cookie can contain, but is not limited to, information specific to the user, information regarding the user's computer system, e.g., media content applications thereon, a unique identifier such as a MAC (machine address code) address and/or an IP address, and other information specific to the user and the computer system operated by the user. The information regarding the client computer system, the user of the system, and an access key described herein can be collectively referred to as authorization data.

Advantageously, with information regarding the user and the user's computer system, a web server can determine when a user of one computer system has given their username and password to another user using another computer system. If the web server detects unauthorized sharing of usernames and passwords, it can block the computer system from future access to copyrighted media content available through the web server for any specified period of time, e.g., for a matter of minutes or hours to months, years, or longer.

Still referring to FIG. 1, CCM 100 further includes one or more coder/decoders (codec) 103 that, in one embodiment, is/are adapted to perform, but is/are not limited to, encoding/decoding of media content files, compressing/decompressing of media content files, detecting that delivered media content files are encrypted as prescribed by CCM 100. In the present embodiment, coder/decoder 103 can also extract key fields from a header attached to each media content file for, in part, verification of the media content file. In one embodiment, codec 103 can also perform a periodic and repeated check of the media content file, while the media content file is passed to the media content player application, e.g., in a frame by frame basis or in a buffer by buffer basis, to ensure that CCM 100 rules are being enforced at any particular moment during media content playback. It is noted that differing codec 103 can be utilized in conjunction with various types of copyrighted media content including, but not limited to, audio files, video files, graphical files, alphanumeric files and the like, such that any type of media content file can be protected in accordance with embodiments of the present invention.

With reference still to FIG. 1, CCM 100 also includes one or more agent programs 104 which are configured to engage in dialogs and negotiate and coordinate transfer of information between a computer system, a server, and/or media content player applications, with or without recording functionality, that are operable within a client computer system. In addition, agent program 104 can be configured to maintain system state, verify that other components are being utilized simultaneously, to be autonomously functional without knowledge of the client, and can also present messages, e.g., error messages, media content information, advertising, etc., via a display window or electronic mail. This enables detection of proper skin implementation and detection of those applications that are running It is noted that agent programs are well known in the art and can be implemented in a variety of ways in accordance with the present embodiment.

CCM 100 also includes one or more system hooks 105. A system hook 105 is, in one embodiment, a library that is installed in a computer system and intercepts system wide events. For example, a system hook 105, in conjunction with skins 106, can govern certain properties and/or functionalities of media content player applications operating within the client computer system, including, but not limited to, mouse click shortcuts, keyboard shortcuts, standard system accelerators, progress bars, save functions, pause functions, rewind functions, skip track functions, forward track preview, copying to CD, copying to a portable electronic device, and the like.

It is noted that the term governing, can refer to a disabling, deactivating, enabling, activating, etc., of a property or function. Governing can also refer to an exclusion of that function or property, such that a function or property may be operable but unable to perform in the manner originally intended. For example, during playing of a media content file, the progress bar may be selected and moved from one location on the progress line to another without having an effect on the play of the media content file.

In one embodiment, system hook 105 compares the information for the media content player application operating in client computer system with a list of "signatures" associated with known media content recording applications. In one embodiment, the signature can be, but is not limited to being, a unique identifier of a media content player application and which can consist of the window class of the application along with a product name string which is part of the window title for the application. Advantageously, when new media content player applications are developed, their signatures can be readily added to the signature list via an update of CCM 100 described herein.

The following C++ source code is exemplary implementation of the portion of a system hook 105 for performing media content player application detection, in accordance with an embodiment of the present invention.

```
int
IsRecorderPresent(TCHAR * szAppClass,
        TCHAR * szProdName)
{
    TCHAR       szWndText[_MAX_PATH]; /* buffer to receive title
string for window */
    HWND        hWnd;       /* handle to target window for
operation */
    int         nRetVal;    /* return value for operation */
    /* initialize variables */
    nRetVal = 0;
    if ( _tcscmp(szAppClass, _T("#32770"))
        == 0)
    {
        /* attempt to locate dialog box with specified window title */
        if ( FindWindow((TCHAR *) 32770, szProdName)
            != (HWND) 0)
        {
            /* indicate application found */
            nRetVal = 1;
        }
    }
    else
    {
        /* attempt to locate window with specified class */
        if ( (hWnd = FindWindow(szAppClass, (LPCTSTR) 0))
            != (HWND) 0)
        {
            /* attempt to retrieve title string for window */
            if ( GetWindowText(hWnd,
                    szWndText,
                    _MAX_PATH)
                != 0)
            {
                /* attempt to locate product name within title string */
                if ( _tcsstr(szWndText, szProdName)
                    != (TCHAR *) 0)
                {
                    /* indicate application found */
                    nRetVal = 1;
                }
            }
        }
    }
    /* return to caller */
    return nRetVal;
}
```

In one embodiment, system hook 105 can also selectively suppress waveform input/output operations to prevent recording of copyrighted media content on a client computer system. For example, system hook 105, subsequent to detection of bundled media content player applications operational in a client computer system can stop or disrupt the playing of a media content file. This can be accomplished, in one embodiment, by redirecting and/or diverting certain data pathways that are commonly used for recording, such that the utilized data pathway is governed by CCM 100. This can be performed within a driver shim for a standard operating system waveform output device. Moreover, the driver shim may be configured to appear as the default waveform audio device to client level application programs. Thus, requests for processing of waveform audio input and/or output will pass through the driver shim prior to being forwarded to the actual waveform audio driver. Such waveform input/output suppression can be triggered by other components of CCM 100, e.g., agent 104, to be active when a recording operation is initiated by a client computer system during the play back of media content files which are subject to the DMCA. The driver shim can be implemented for nearly any media content in nearly any format including, but not limited to, audio media content files and audio input and output devices.

The following C++ source code is an exemplary implementation of the portion of a system hook 105 for diverting and/or redirecting certain data pathways that are commonly used for recording of media content, in accordance with an embodiment of the present invention.

```
DWORD
_stdcall
widMessage(UINT         uDevId,
    UINT        uMsg,
    DWORD       dwUser,
    DWORD       dwParam1,
    DWORD       dwParam2)
{
    BOOL        bSkip;      /* flag indicating operation to be
                    skipped */
    HWND        hWndMon;    /* handle to main window for
                    monitor */
    DWORD       dwRetVal;   /* return value for
                    operation */
    /* initialize variables */
    bSkip   = FALSE;
    dwRetVal = (DWORD) MMSYSERR_NOTSUPPORTED;
    if (uMsg == WIDM_START)
    {
        /* attempt to locate window for monitor application */
        if ( (hWndMon = FindMonitorWindow( ))
            != (HWND) 0)
        {
            /* obtain setting for driver */
            bDrvEnabled = ( SendMessage(hWndMon,
                        uiRegMsg,
                        0,
                        0)
                    == 0)
                ? FALSE : TRUE;
        }
        if (bDrvEnabled == TRUE)
        {
            /* indicate error in operation */
            dwRetVal = MMSYSERR_NOMEM;
            /* indicate operation to be skipped */
            bSkip = TRUE;
        }
    }
    if (bSkip == FALSE)
    {
        /* invoke entry point for original driver */
        dwRetVal = CallWidMessage(uDevId, uMsg, dwUser,
dwParam1, dwParam2);
    }
    /* return to caller */
    return dwRetVal;
}
```

When properly configured, system hook 105 can govern nearly any function or property within nearly any media content player application that may be operational within a client computer system. In one embodiment, system hook 105 is a DLL (dynamic link library) file. It is further noted that system hooks can be implemented in nearly any operating system.

In FIG. 1, CCM 100 also includes one or more skins 106, designed to be installed in a client computer system. In one embodiment, skins 106 are utilized to assist in client side compliance with the DMCA regarding copyrighted media content. Skins 106 are customizable interfaces that, in one embodiment, are displayed on a display device of computer system and provide functionalities for user interaction of delivered media content. Additionally, skins 106 can also provide a display of information relative to the media content file including, but not limited to, song title, artist name, album title, artist bio, and other features such as purchase inquiries, advertising, and the like.

Furthermore, when system hook 105 is unable to govern a function of the media content player application operable on a client computer system such that client computer system could be in non-compliance with DMCA and/or RIAA restrictions, a skin 106 can be implemented to provide compliance.

Differing skins 106 can be implemented depending upon the DMCA and/or RIAA restrictions applicable to each media content file. For example, in one embodiment, a skin 106 may be configured for utilization with a media content file protected under a non-interactive agreement and may not include a pause function, a stop function, a selector function, and/or a save function, etc. In another embodiment, skin 106 may be configured to be utilized with a media content file protected under an interactive "no save" agreement such that skin 106 may include a pause function, a stop function, a selector function, and for those media content files having an interactive with "save" agreement, a save or a burn to CD function.

Still referring to FIG. 1, each skin 106 can have a unique name and signature and can be implemented, in part, through the utilization of an MD (message digest) 5 hash table or similar algorithm. An MD 5 hash table can be, in one implementation, a check-sum algorithm. Since modification of the skin would change the check sum and/or MD 5 hash, without knowledge of the MD 5 hash table, changing the name or modification of the skin may simply serve to disable the skin, in accordance with one embodiment of the present invention. Since CCM 100 verifies skin 106, MD 5 hash tables advantageously provide a deterrent against skin name changes and/or modifications made thereto.

In one embodiment, CCM 100 also includes one or more custom media content device driver(s) 107 for providing an even greater measure of control over the media content stream while increasing compliance reliability. A client computer system is configured to utilize a custom media content device application, e.g., a custom audio device application, a custom video device application, etc., that is emulated by a custom media content device driver 107. With reference to audio media content, the emulation is performed in a waveform audio driver associated with a custom audio device. Driver 107 is configured to receive a media content file being outputted by the system prior to the media content file being sent to a media content output device, e.g., a video card for video files or a sound card for audio files, etc. In one embodiment, client computer system is configured with a custom media content device driver 107 as the default device driver for media content file output. In one embodiment, an existing GUI (graphical user interface) can be utilized or a GUI can be provided, e.g., by utilization of a skin 106 or a custom web based player application, for forcing or requiring the system to have driver 107 as the default driver.

Therefore, when a media content file is received by the system, the media content file is playable, provided the media content file passes through the custom media content device application, emulated by custom media content device driver 107, prior to being outputted. However, if an alternative media content player application is selected, delivered media content files will not play on the system.

Thus, secured media content player applications would issue a media content request to the driver for the custom media content device which then performs necessary media content input suppression, e.g., waveform suppression for audio files, prior to forwarding the request to the default waveform audio driver for audio files.

It is noted that requests for non-restricted media content files can pass directly through custom media content device driver 107 to a waveform audio driver operable on the system. It is further noted that for either secured media content or non-restricted media content, e.g., audio media content files, waveform input suppression can be triggered by other components of CCM 100, e.g., agents 104, system hooks 105, and skins 106, or a combination thereof, to be active when a recording operation is initiated simultaneously with playback of secured media content files.

Advantageously, by virtue of being configured with a custom media content device, emulated by a custom media content device driver 107, as the default device driver, those media content player applications that require their particular device driver to be the default driver, e.g., Total Recorder, etc., are rendered non-functional for secured music. Further advantageous is that an emulated custom media content device provides no native support for those media content player applications used as a recording mechanism, e.g., DirectSound capture, etc., that are able to bypass user-mode drivers for most media content devices. Additionally, by virtue of the media content being sent through device driver 107, thus effectively disabling unauthorized saving/recording of the media content files; media content files that are delivered in a secured delivery system do not have to be encrypted to provide compliance with copyright restrictions and/or licensing agreements, although, in another embodiment, they still may be encrypted.

Custom Media Content Library

A subversive and illegal technique for capturing outgoing copyright media content data is addressed and overcome herein. Specifically, the present technology stops a copyright-disregarding recording application from establishing a system hook for the purpose of generating an illegal copy of the copyright media content. That is, the present technology redirects calls made by secure media content playback applications to unsecure standard operating system services used for rendering the raw media content data. In so doing, the system hook is no longer able to intercept the raw media content data and therefore no longer able to deliver the intercepted data to illicit recording application 290.

Additionally, since the present technology implements a custom media content library utilizing a new pathway at the CCM-enabled playback/recording application to circumvent the illegal copying techniques without interfering or disrupting the commonly used pathway, the computer system maintains the capability of delivering media content that may be legally copied to the recording application while protecting copyrighted media content from being illegally copied by the same, or another, recording application.

Figure 2:
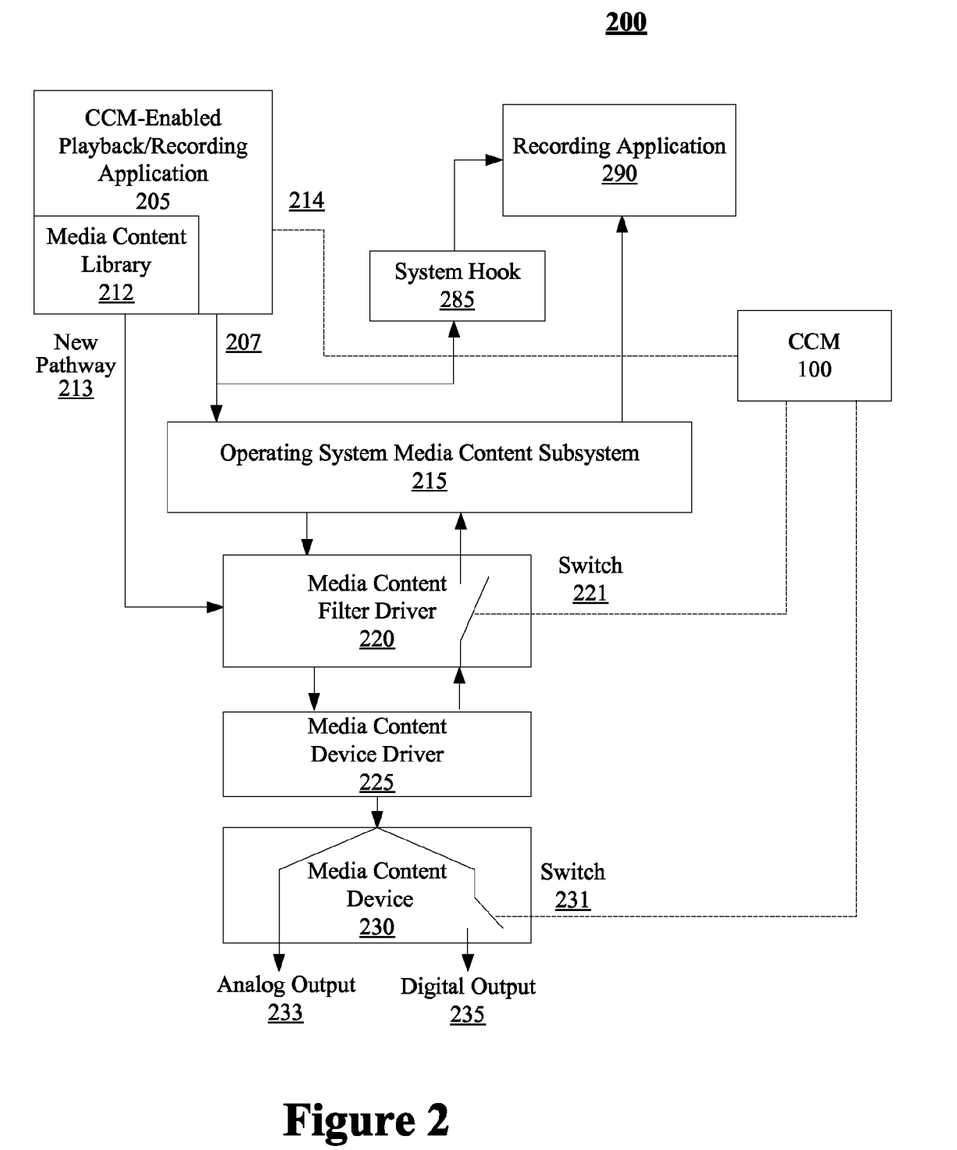
FIG. 2 is a block diagram of a custom media content library utilized to secure media content, in accordance with an embodiment of the present technology

With reference now to FIG. 2, a block diagram of a computer system 200 having a custom media content library to secure media content is shown in accordance with an embodiment of the present technology. In one embodiment, FIG. 2 includes a number of distinct components and devices for clarity in the discussion. However, in another embodiment, more or fewer components and devices may be present. Further, in yet another embodiment, the components and devices may be combined into one or more components able to perform a number of the actions shown in FIG. 2.

In one embodiment, by utilizing the media content library 212 in conjunction with the CCM-enabled playback/recording application 205 and the CCM 100, secure media content may be rendered, played, recorded and copied without the data being in an unsecure environment. In addition, due to the secure environment, in one embodiment no encryption of the media content is necessary.

For example, as illustrated in FIG. 2, when a hooked system service, e.g., OS media content subsystem 215, is called, the system hook 285 will gain control of the commonly used pathway 207 first, allowing the recording application 290 to perform application-specific processing before passing control to the actual OS media content subsystem 215. The system hook 285 will thus allow the recording application 290 to capture output data without the use of a virtual media content device driver or plug-in module.

However, embodiments described herein, overcome this illegal capture technique by incorporating a media content library 212 of media content functions that make use of lower-level components in the media content subsystem, e.g., media content filter driver 220, to render secure media content data. These lower-level components are not affected by the system hooks 285 that are used by recording applications, and thus copyright protected media content can pass securely from the CCM-enabled playback/recording application 205 to a part of the media content subsystem, e.g., the media content filter driver 220 that is protected by the existing CCM, e.g., CCM 100.

For example, in one embodiment, custom media content library 212 provides a secure path for the media content as it is delivered from the CCM-enabled playback/recording application 205 to the operating system (OS) media content subsystem 215. In one embodiment, media content library 212 is able to securely receive the media content from the CCM-enabled playback/recording application 205 because it is linked directly into the CCM-enabled playback/recording application 205. That is, media content library 212 is not a dll and is not implemented as a standalone object. In other words, because media content library 212 is linked directly into the CCM-enabled playback/recording application 205, a system hook 285 is not able to hook media content as it is passed from the CCM-enabled playback/recording application 205 to the media content library 212.

In addition, in one embodiment, the media content library 212 operates below both the kernel mode and the driver level. As such, during the transmission of the digital media content from the media content library 212 to the media content filter driver 220 via new pathway 213, there is no unsecure kernel mode or driver level mode pathways for system hook 285 to "hook".

For example, instead of using the commonly used pathway 207 to deliver copyright protected media content, such as raw wave data, to an OS media content subsystem 215 for rendering, the CCM-enabled playback/recording application 205 will utilize custom media content library 212 to generate a new pathway 213 and deliver the raw wave data directly to the media content filter driver 220. In other words, in one embodiment, the utilization of media content library 212 will provide more general control over the media content stream while increasing compatibility and reliability of the overall solution. For example, media content library 212 would involve the configuration of new pathway 213 within the computer system 200 to securely deliver the media content to a media content filter driver 220 at the kernel level.

At the same time, the CCM-enabled playback/recording application 205 will inform CCM 100, via communication pathway 214, that copyright protected raw data will be received at media content filter driver 220 and that protection is to be enabled at the kernel mode. As described herein, the CCM 100 is able to protect the copyright protected media content by, in one embodiment, instructing the media content device driver 225, via switch 221, to suppress waveform input operations. Moreover, in some cases, the CCM 100 may also instruct media content device 230, via switch 231, to suppress waveform output operations such as digital output 235.

Thus, in one embodiment, controlled media content directed for rendering at the OS media content subsystem 215 will first pass securely from the secure CCM-enabled playback/recording application 205 to the media content filter driver 220 and then remain secure during rendering by CCM 100.

In one embodiment, requests for non-secure media content traffic would also be controlled by media content library 212 utilizing the new pathway 213. However, in another embodiment, requests for non-secure media content traffic may pass directly from the CCM-enabled playback/recording application 205 to the OS media content subsystem 215 via the commonly used pathway 207. When passing the media content directly from the CCM-enabled playback/recording application 205 to the OS media content subsystem 215 via the commonly used pathway 207, the media content would be susceptible to system hook 285 and recording application 290. Of course, since the media content utilizing the commonly used pathway 207 is uncontrolled, utilizing the system hook 285 in an attempt to obtain a subversive copy of the media content would be immaterial since the media content may be legally copied.

In another embodiment, for media content devices 230 that support "standard" streaming at the kernel level, the OS media content subsystem 215 may issue a request to the media content device 230 for each block of data to be read for a capture operation. In one embodiment, if the media content is controlled, the CCM 100 can intercept each request, such as at switch 221 and control the content in the data buffer that is returned to the OS media content subsystem 215. As stated herein, the CCM 100 control can include (but is not necessarily limited to) the muting of the waveform data, and the introduction of distortion into the media content stream.

For media content devices 230 that either support "looped" streaming or the WaveRT port type, the OS media content subsystem 215 may issue one or more requests at the start of the capture operation to either provide the location of the application-specific media content buffer to be used for the operation or obtain the address of the driver-provided capture buffer. The OS media content subsystem 215 will then pass data directly to the recording application 290 using these buffers, and thus the CCM 100 will be unable to monitor the data stream during the capture operation. In one embodiment, to prevent unauthorized recording for media content devices 230 supporting these techniques, the CCM 100 will instruct the media content device 230 to stop the capture operation at switch 221 and/or switch 231. If the recording application 290 or OS media content subsystem 215 attempts to subsequently restart the capture, the CCM 100 will detect the restart request and prevent the request from being serviced by the media content device 230.

For the purpose of clarification, "standard" streaming is the technique where multiple data buffers are used to stream audio data, with the kernel acting upon one buffer at a time. "Looped" streaming uses a single shared buffer, with the client and the kernel acting upon different regions within the buffer. "WaveRT" uses a mechanism similar to looped streaming, except that the buffer is allocated and managed by the audio device rather than the kernel.

As described herein, the CCM 100 will monitor the system 200 for unauthorized capture operations. Upon detection of such operations, CCM 100 can respond by continuing to allow playback of secure media content data while controlling media content capture, or to control the playback of the media content data. This control can include (but is not necessarily limited to) the muting of waveform input or output, and the introduction of distortion into the media content stream.

Thus, by utilizing the technology described herein, that is, the secure delivery of copyright protected media content via the media content library 212 using the user mode new pathway 213 and the CCM 100, unsecure OS media content subsystem 215 is bypassed and the media content is passed to lower level media content components, such as media content filter driver 220, protected by the CCM 100. Then, when the copyright protected media content is then passed from the media content filter driver 220 to the OS media content subsystem 215 for rendering, it is already protected by the CCM 100 and the previously utilized direct sound pirate system hook 285 will no longer be able to access the media content.

In other words, the copyright protected media content remains in a secure environment the entire time it is on the computer system 200. Because the computer system 200 provides a secure environment for the copyright protected media content, in one embodiment no additional measures, such as encryption, or the like on any or all of the copyright protected media content are necessary for ensuring copyright compliance.

SCMS Security Thread Embedding

Figure 3:
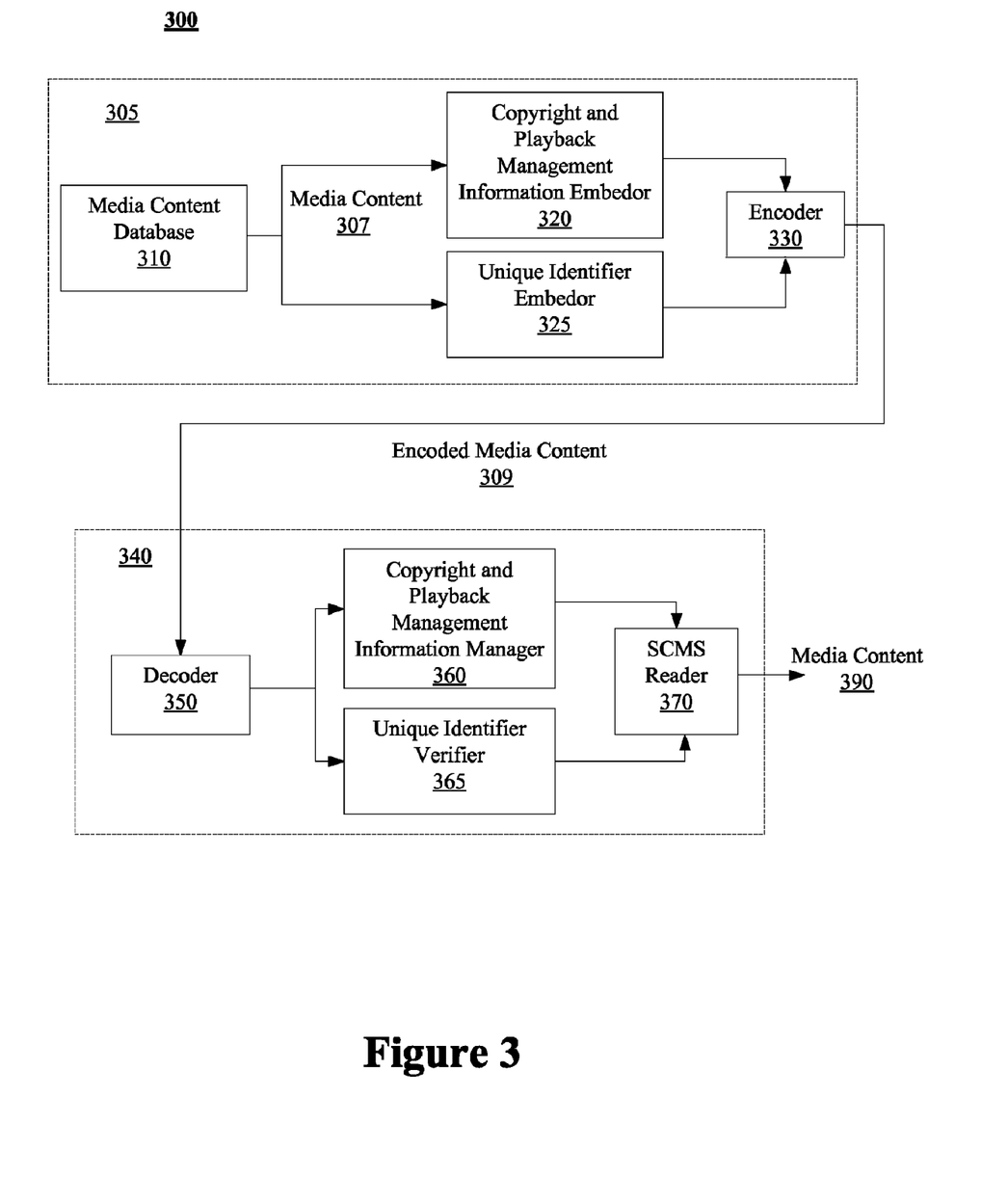
FIG. 3 is a block diagram of a system for enhancing copyright revenue generation, in accordance with an embodiment of the present invention.

A media content provider, such as a media content web broadcaster, that provides a large database of media content, such as but not limited to sound recordings, may transmit large volumes of copyrighted media content and may be required to pay large amounts of royalty fees. System 300 includes a system 305, a device 340 and a copyright royalty payment controller 380. The system 305 includes a frame-based media content database 310, a copyright and playback management information embedor 320, a unique identifier embedor 325 and an encoder 330.

Frame Based Security Thread Embedding

The system 305 facilitates copyright revenue generation by facilitating in the ensuring of appropriate payment of entitled copyright royalties. In one embodiment, the system 305 is a web broadcaster that broadcasts media content via the Internet. It should be appreciated that the media content is any frame-based media content 307 which is stored in a frame-based media content database 310. In one embodiment, the frame-based media content 307 are MPEG-1 Audio Layer 3 (MP3) files intrinsically associated with an accompanying series of related images.

In one embodiment, the system 305 facilitates the ensuring of appropriate payment of entitled copyright royalties of copyright works by introducing technological measures to the a copyright protected frame-based media content 307 by way of copyright and playback management information embedor 320. In another embodiment, the system 305 facilitates the ensuring of appropriate payment of entitled copyright royalties of copyright works by introducing technological measures to the copyright protected frame-based media content 307 by way of unique identifier embedor 325.

It should be appreciated that the copyright and playback management information can be but is not limited to a SCMS. SCMS is a scheme to protect copyrights of digital productions by preventing data from being repeatedly copied. SCMS is built into a media content appliance which has a function to create a copy of digital data, such as an MP3 file. The media content appliance with the SCMS built into it can prevent a first-generation copy recorded by the user from being copied again. In other words, the SCMS prevents a second or higher generation copy from being created.

Copyright and playback management information embedor 320 embeds copyright and playback management information within frame-based media content 307. It should be appreciated that the copyright and playback management information is any information related to the management and/or the enforcement of copyright protection associated with a copyright protected work. In various embodiments, the copyright and playback management information can be but is not limited to the number of copies allowed of the frame-based media content, the number of copies allowed of the frame-based media content, version number of the frame-based media content or no copies allowed, rules for subsequent copies and the like, as well as the number of plays allowed of the frame-based media content and the types of devices that are allowed to play the media content.

In one embodiment, the copyright management information indicates which machine, product and/or company the copyright protected work came from and/or is allowed to be played back on. It should also be appreciated that the copyright management information may be forensics related information, such as but not limited to tracking information. Further, in one embodiment, the copyright management information is an expiration date(s) associated with the copyright protected work.

It should be appreciated that the copyright and playback management information embedor 320 embeds copyright and playback management information within at least one data field of the frame-based media content 307. In one embodiment, the data field is an application-private bit of a MP3 file. Typically, MP3 files are segmented into thousands of frames. For example, a three to five minute song can have approximately 8,000 to 12,000 frames. Each frame contains a fraction of a second's worth of audio data. At the beginning of every data frame is a header frame which stores 32 bits of meta-data related to the coming data frame. The MP3 header begins with a sync block that consists of 11 bits. The sync block allows players to search for and lock onto the first available occurrence of a valid frame. Following the sync block are a plurality of other header blocks that facilitate in the proper decoding and subsequent playing of the MP3 file. One of the other header blocks is the application-private bit, which allows for application-specific triggers. For example, if there are 8,000 frames in an MP3 file, there is a private bit corresponding to each frame for a total of 8,000 private bits.

In one embodiment, the copyright and playback management information is a multiple bit data structure using the application-private bits in the MP3 frame headers across consecutive audio frames. For example, if the copyright and playback management information contains 32 bits, then each bit is stored in 32 consecutive application-private bits in corresponding 32 consecutive frames. In particular, the first bit of the copyright and playback management information is stored in the application-private bit of the header for the first audio frame. The second bit of the copyright and playback management information is stored in the application-private bit of the second audio frame and so on until all the data in the copyright and playback management information is stored in consecutive frames.

Further, the sequence of bits associated with the copyright and playback management information data block is continuously repeated throughout the entire audio file. Once the entire data block has been encoded, the first bit of the copyright and playback management information data block is stored in the application-private bit of the header for the next frame within the MP3 file. Accordingly, the playback application is able to detect the copyright and playback management information for the audio file irrespective of the starting position within the file from which the playback was initiated. For example, if the MP3 file has 8,000 frames and a corresponding 8,000 application private bits, then a copyright and playback management information data block of 32 bits is initially stored in the first 32 consecutive application-private bits and repeatedly stored in consecutive application-private bits, for a total of 250 consecutive and repeated instances of the copyright and playback management information data block stored in the entire MP3 file.

In one embodiment, the copyright and playback management information (CMI) is a 32-bit data structure having the following format. It should be appreciated that the 32-bit data structure is a SCMS data structure used to encode playback rights information in addition to copy control information. For example, a copyright holder may choose to allow a particular work to be played freely a certain number of times before requiring a license key or other access mechanism.

Elements of the 32-bit data structure are shown in Table 1:

| Offset | Description |
| --- | --- |
| 0 | First byte of CMI, set a fixed value to facilitate detection by a playback or secure copy/playback application |
| 8 | Second byte of CMI, set to fixed value to facilitate detection by a playback or secure copy application |
| 16 | Version number of CMI (three binary bits) |
| 19 | Flag indicating copying not allowed for media content file |
| 20 | If bit at offset 19 is not set, number of copies allowed for file (up to a maximum of 15). A value binary 0000 indicates that the file may be freely copied. |
| 24 | Number of plays allowed for file (up to a maximum of 255). If this field is set to binary 00000000, the file can be freely played. |

Additional security is available by using an encryption mechanism. Specifically, an encoder generates one or more sequences of data bytes to be used as keys for the encoding of the media content data for the file. The key sequences can be derived from a cryptographically secure digest taken across all or part of the data for the file. Thus, the key sequences are most likely different for each media content file.

The key sequences that are used for the encryption for all or part of the SCMS data block are unique to each copyright protected work. The key sequences can be generated using data from the copyright protected work. Thus the SCMS data block can be used to help ensure the integrity and authenticity of the copyright protected work.

It should be appreciated that to allow playback devices to more easily detect the presence of copyright and playback management information, the two marker bytes for each copyright and playback management information data block can be left unencoded.

In one embodiment, system 305 facilitates in the ensuring of appropriate payment of entitled copyright royalties of the copyright protected frame-based media content 307 by adding technological measures to the frame-based media content via unique identifier embedor 325. Unique identifier embedor 325 embeds at least one unique identifier into a frame-based media content file. In one embodiment, the at least one unique identifier is invariant and is embedded into metadata, such as but not limited to an ID3V2 tag. Further, in one embodiment, at least one unique identifier may be a valid copyright registration number from the United States Copyright Office associated with copyright protected frame-based media content 307. In another embodiment, at least two copyright registration numbers are embedded into ID3V2 tags of an MP3 file.

System 305 encodes the frame-based media content subsequent to the copyright and playback management information embedor 320 embedding copyright and playback management information into the frame-based media content 307 and/or the unique identifier embedor 325 embedding at least one unique identifier into the frame-based media content 307.

Transcoding can be performed on a frame-based media content that results in frameless media content. For example, an MP3 file can be transcoded into another format (e.g., way, AC3), such that it loses its frames, header, footer and as a result all that is left are the payloads. In a frameless media content file, the copyright and playback information can be encoded by selecting a certain frequency not usually perceived by the listener and then changing its value to reflect the copyright and playback information data. For example, if a low frequency is selected and sampled, such that there is a guaranteed match on a significant pattern, the copyright and playback information can be further read for copyright and playback rules.

Media content device 340 includes a decoder 350 that decodes the encoded frame-based media content 309, copyright and playback management information manager 360, unique identifier verifier 365 and royalty payment ensurer 370. Copyright and playback management information manager 360 manages the frame-based media content 307 according to the copyright and playback information that is embedded into the frame-based media content.

Unique identifier verifier 365 verifies that the at least one unique identifier embedded in the decoded frame-based media content is the same unique at least one unique identifier that was embedded into the frame-based media content 307. In one embodiment, unique identifier verifier 365 verifies that the two copyright registration numbers associated with the MP3 file embedded in the ID3V2 tags of an MP3 file are the same two copyright registration numbers associated with the MP3 file embedded in the ID3V2 tags subsequent decoding of the MP3 file in the device 340. It should be appreciated that if the unique identifier verifier 365 determines that the at least one unique identifier decoded at device 340 is the same as the at least one unique identifier that was embedded into the frame-based media content 307, then it helps determine that the decoded frame-based media content 307 has not been tampered with and is not a counterfeit. It should also be appreciated that the ID3V2 tags are metadata in the MP3 frame headers, as described above.

In one embodiment, the royalty payment ensurer 370 facilitates in ensuring appropriate payment of entitled copyright royalties of the copyright protected frame-based work 307 based at least in part on the embedded copyright and playback management information. In another embodiment, the royalty payment ensurer 370 facilitates in ensuring appropriate payment of entitled copyright royalties of the copyright protected frame-based work 307 based at least in part on the embedded at least one unique identifier. Typically, the copyright owner of a copyright protected work is entitled to copyright royalties upon the transmission of a frame-based media content 307. Based at least in part upon the output of the copyright management information manager 360 and the unique identifier verifier 366, the copyright owner of the frame-based media content is ensured appropriate payment of entitled royalties.

The copyright royalty payment controller 380 receives information from the device 340 and pays the copyright owner of the copyright protected work for the use of the copyright protected work accordingly. It should be appreciated that the copyright royalty payment controller 380 can be but is not limited to a performing rights organization (e.g., The American Society of Composers, Authors and Publishers, Broadcast Music, Inc., SESAC, Inc. and SoundExchange) and/or mechanical rights agency (e.g., Harry Fox Agency and Canadian Mechanical Rights Reproduction Agency).

The following description is another example of copyright and playback management information (CMI) in a 24-bit data structure having the following format. It should be appreciated that portions of the 24-bit data structure and portions of the similar 32-bit data structure may be interchanged, modified, otherwise utilized in an SCMS data structure used to encode playback rights information in addition to copy control information.

Elements of the 24-bit data structure are shown in Table 2:

| Offset | Description |
|---|---|
| 0 | First byte of SCMS marker, set to binary 10111011 (0xBB). |
| 8 | Second byte of SCMS marker, set to binary 01011100 (0x5C). |
| 16 | Version number for marker, set to binary 01 (Version 1). |
| 18 | Reserved, must be set to binary 0. |
| 19 | Flag indicating copying not allowed for audio file. |
| 20 | If bit at offset 19 is not set, number of copies allowed for audio file (up to a maximum of 15). A value of binary 0000 indicates that the file may be freely copied. If bit at offset 19 is set, this field is reserved, and must be set to binary 0000. |

Implementation for MP3 Audio Files

This SCMS data structure may be stored using the application-private bit in the MP3 frame header across consecutive audio frames. That is, the first bit of SCMS data may be stored in the application-private bit of the header for the first audio frame, the second bit in the application-private bit of the header for the second audio frame, and so on.

The sequence of bits associated with the SCMS data block may be repeated continuously throughout the entire audio file. That is, once the entire data block has been encoded, the first bit of the SCMS data may be stored in the application-private bit of the header for the next MP3 frame within the file. Thus it would be possible for a playback application to detect the SCMS information for the audio file irrespective of the starting position within the file from which playback was initiated.

Implementation for CD Media

In one embodiment, the SCMS data structure may be stored using the "S" subchannel bit in the control byte across consecutive sections within a given data track on the disc. That is, the first bit of SCMS data may be stored in the "S" subchannel bit for the first section, the second bit in the "S" subchannel bit for the second section, etc.

The sequence of bits associated with the SCMS data block may be repeated continuously throughout the entire data track. That is, once the entire data block has been encoded, the first bit of the SCMS data may be stored in the "S" subchannel bit for the next section within the file. Thus it would be possible for a playback application to detect the SCMS information for the data track irrespective of the starting position within the track from which reading or playback was initiated.

In addition, it would be possible to specify different SCMS data for different data tracks on the disc. For example, for an audio CD, this could allow the ability to specify one or more tracks that can be freely copied, while retaining protection for the remaining tracks on the disc.

Implementation for DVD Media

The SCMS data structure may be stored using the six-byte CPR_MAI field within the data frames for the disc. For protected files on the disc, in one embodiment, the first byte of the CPR_MAI field may have the following structure:

| Field | Value |
|---|---|
| CPM | Set to 0x1 to indicate presence of copyrighted material |
| CP_SEC | Set to 0x1 to indicate copyright protection required. |

-continued

| Field | Value |
|---|---|
| CGMS | Set to 0x11 to indicate no copies allowed for file. |
| CP_MOD | Set to 0x1011 ("B") to indicate presence of MRT-specific SCMS information for file. |

The next three bytes (bytes 1 through 3) of the CPR_MAI field would contain the three-byte SCMS data block. The final two bytes (bytes 4 and 5) would be reserved, and have a value of zero.

In one embodiment, since the SCMS data would be encoded into every data frame for the file in question, it would be possible for a playback application to detect the SCMS information for the audio file irrespective of the starting position within the file from which playback was initiated.

In addition, it would be possible to specify different SCMS data for different files on the disc. For example, for a video DVD containing multiple movies, this could allow the ability to specify one or more movies that can be freely copied, while retaining protection for the remaining movies on the disc.

Lightweight Encryption of SCMS Data

If additional security is required for the SCMS data, it would be possible to encode the data using an XOR-ADD mechanism. Specifically, the encoder will generate two sequences of data bytes to be used as keys for the encoding of the audio data for the file. These key sequences may be derived, for example, from the MD5 hash sequence taken across the audio tag data for the file (either the MPEG audio tag or the ID3 tag, whichever is present), the table of contents for a CD, or the primary volume descriptor for a DVD. Thus the key sequences will most likely be different for each audio file or disc.

The data bytes at even-numbered locations within the buffer for the MD5 digest may be concatenated to form the XOR key for the encoding, and the data bytes at odd-numbered locations may form the ADD key. Thus, in one embodiment, the sizes of the XOR and ADD keys will be eight bytes.

The encoder will then encode the SCMS data bytes by performing a logical XOR using the first key sequence (the "XOR key") followed by an arithmetic addition operation with a byte in the second sequence (the "ADD key"). The playback device will decode the SCMS data by performing an arithmetic subtraction operation using the ADD key, followed by a logical XOR using the XOR key.

Note, in one embodiment, to allow playback devices to more easily detect the presence of SCMS data, the two marker bytes for each SCMS data block may not be encoded.

Stronger Encryption of SCMS Data

If a stronger encryption mechanism is needed for the SCMS data, it would be possible to replace the XOR-ADD mechanism described in the previous section with a more cryptographically secure algorithm, such as Blowfish. The initial key data would still be constructed from a digest built from the tag data for the file, or from a known data structure for disc-based media.

The protection of SCMS data can be made even stronger by modifying the encryption algorithm or the key data continuously during the processing of the file. An example of the latter would be where one key sequence is used to encode the header information for a series of MP3 frame headers, an MD5 hash taken across the audio data for those frames, and the resultant hash combined somehow with the previous hash to form a new key sequence for the encryption of the next collection of frames for the audio file.

However, it should be noted that stronger cryptographic algorithms impose the restriction that the data blocks to be processed must have sizes that are multiples of eight bytes or more.

Additional Header Conventions for MRT MP3 Files

By convention, all MP3 files made available for download from the BlueBeat site will have the original media bit and the copyright bit set in the header of each MP3 audio frame for the file.

Figure 4:
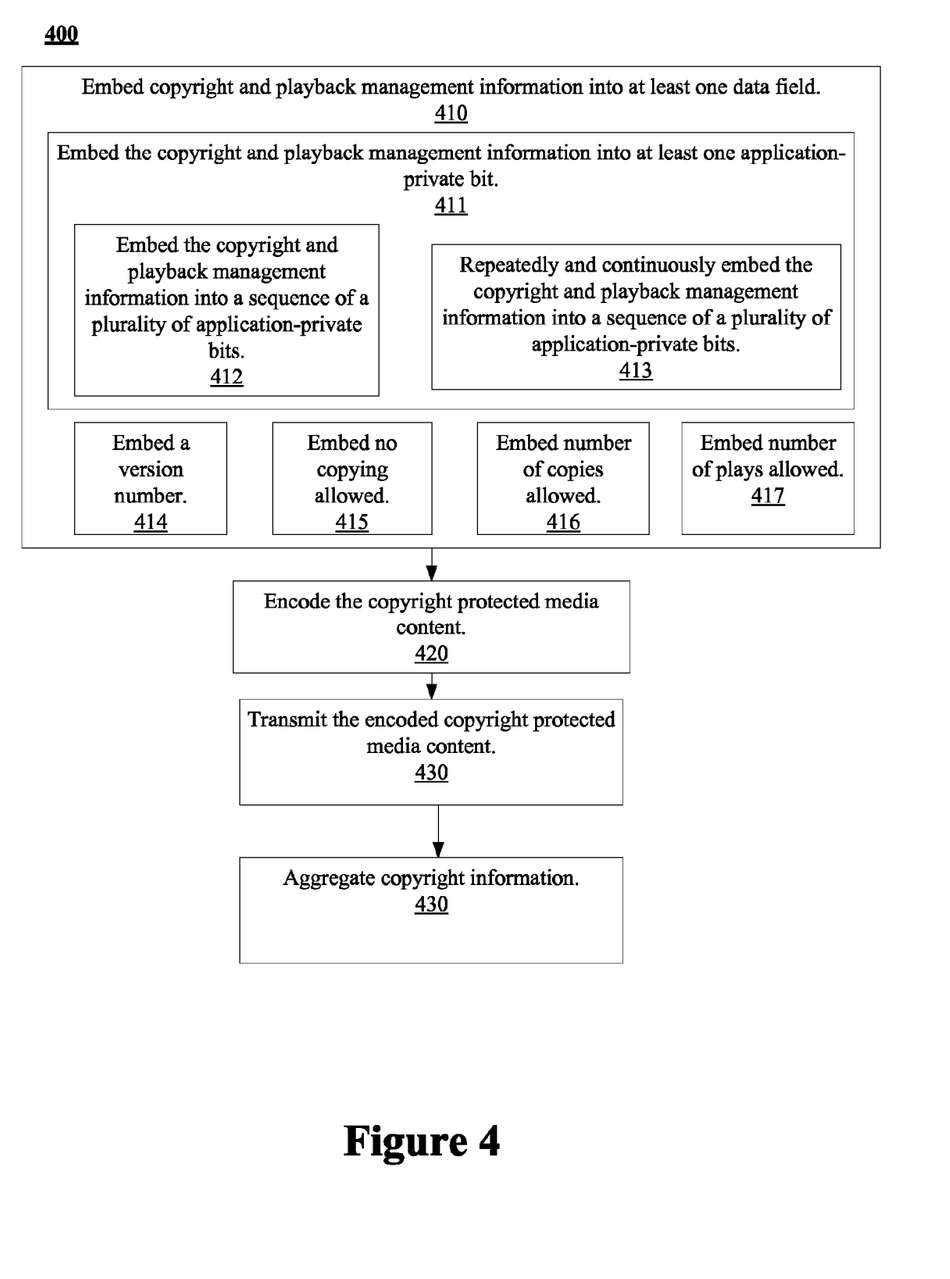
FIG. 4 is a block diagram of a flow chart of a method for enhancing copyright generation, in accordance with an embodiment of the present invention.

FIG. 4 is a flowchart illustrating a process 400 for enhancing copyright revenue generation. In one embodiment, process 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, process 400 is performed at least by system 700 of FIG. 7.

At block 410 of FIG. 4, copyright and playback management information is embedded into at least one data field of the copyright protected frame-based work. The copyright and playback management information corresponds to access to the copyright protected frame-based work. In one embodiment, at block 411, the copyright and playback management information is embedded into at least one application-private bit of at least one corresponding frame of a MP3 file. In another embodiment, at block 412, the copyright and playback management information is embedded into a sequence of a plurality of application-private bits. In another embodiment, at block 413, the copyright and playback management information is repeatedly and continuously embedded into a sequence of a plurality of application-private bits.

In another embodiment, at least two unique identifiers are embedded into at least two data fields of the copyright protected frame-based work. The embedding of the at least two unique identifiers corresponding to access to the copyright protected frame-based work. For example, the at least two unique identifiers may be embedded into an ID3V2 tag of at least one corresponding frame of a MP3 file. In another embodiment, a copyright registration number for an underlining sound recording and/or an underlining composition corresponding to the copyright protected frame-based work is embedded into the frame-based work.

In yet another embodiment, an audio frequency is selected that is not usually perceived by a listener of the copyright protected work. The copyright protected work is a frame-based work that is transcoded to a frameless work. For example, the copyright and playback management information is encoded within the selected audio frequency not usually perceived by a listener of the copyright protected work.

At block 414, the copyright and playback management information is a version number of the work. At block 415, the copyright and playback management information is no copying allowed of the work. At block 416, the copyright and playback management information is a number of copies allowed for the work. At block 417, the copyright and playback management information is a number of plays allowed for the work.

At block 420, the copyright protected frame-based work is encoded. At block 430, the encoded copyright protected frame-based work is transmitted. In one embodiment, at block 435, the encoded copyright protected frame-based work is transmitted to a device. The device decodes the embedded copyright and playback management information to facilitate in the ensuring appropriate payment of entitled copyright royalties of the copyright protected frame-based work. At block 440, appropriate payment of entitled copyright royalties of the copyright protected frame-based work is ensured based at least in part on the embedded copyright and playback management information.

Non-Frame Based Security Thread Embedding

Figure 5:
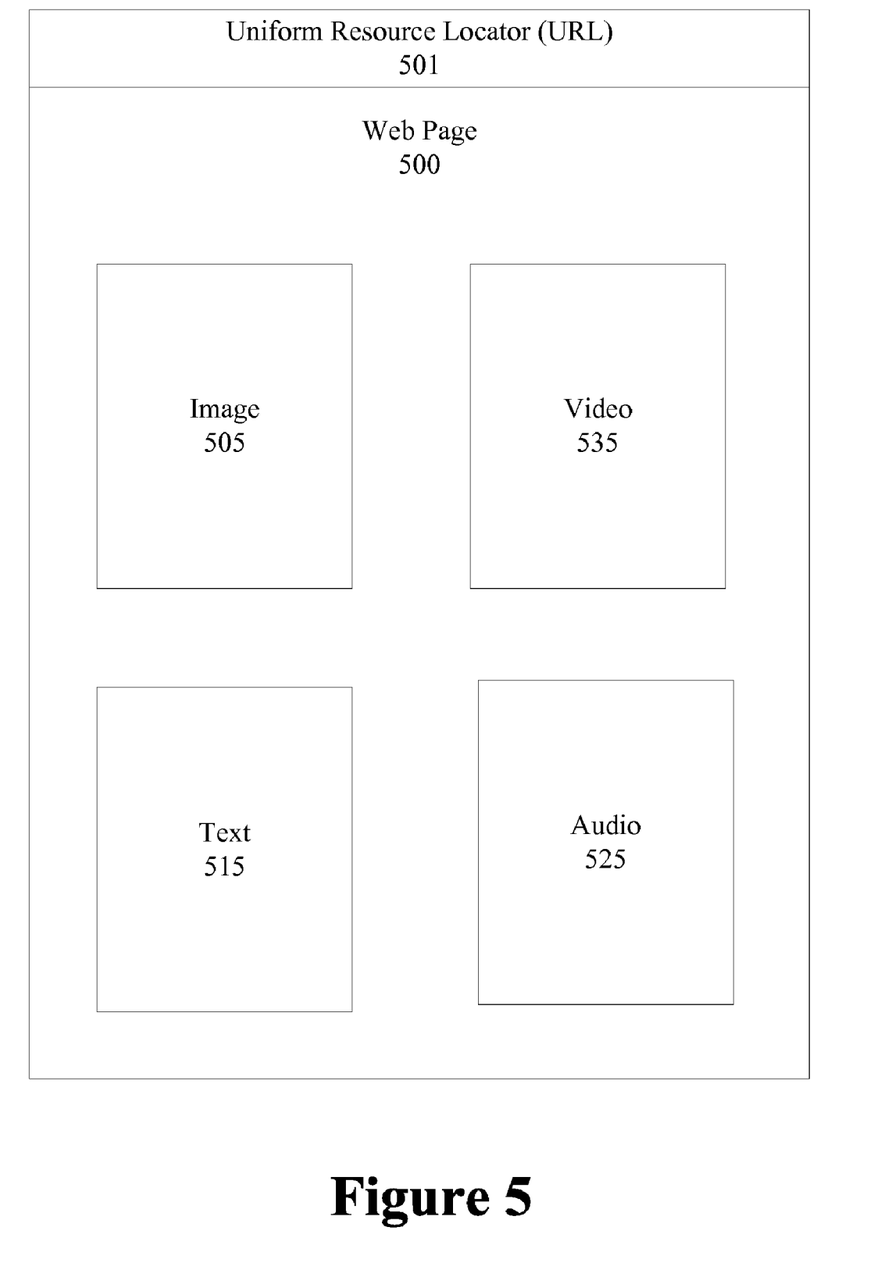
FIG. 5 is a block diagram of a web page in accordance with an embodiment of the present invention.

On the Internet, most content is being provided by the web page such as Web page 500 of FIG. 5. The security thread on each page controls the usage for any copyrighted material on the page. For example, there may be an image 505, sound recording 525, text 515, video recording 535, etc. each may be copyrighted or may not be. Using the technology herein, the security threads on the page would manage the rights for the content that is embedded on the page. For example, the text 515 may be copyrighted while the sound 525 is not, but the video 535 may also be protected. So the security tags will let the SCMS know which is protected, the level of protection (number of plays limited, restriction of retransmission, limitations on copying, etc.). Further, the SCMS information for each copyrighted media embedded on the page may be protected by a single set of SCMS instructions, or SCMS instruction for each media on the page, or a combination thereof. In addition, although a web page is used as one example, as described herein, the present technology is well suited for utilization with email and the like.

In one embodiment, CCM 100 could be on the user device that is doing the browsing; presenting the content, and the like; or it may be a phone home CCM setup. For example, in a phone home scenario, the user's device, such as the browser or the like, will access a remote server to get permission, authorization etc. In another embodiment, the embedded media on the web page may include a copy of the CCM or a link to the CCM and then could either download the CCM and install it directly on end device, or direct the end device to download and install the CCM before the media on the web page can be displayed, seen, watched, heard, etc.

One embodiment herein is directed toward photographs, text, e-books, a web-page, email, etc. Basically, the layout of a page that shows up when the page is navigated to or received by a computing device. In so doing, the technology discussed herein may control usage of the page. In other words, it does not allow for spurious use of the page or specific content thereon. For example, a print page, a copy page, and the like.

Figure 6:
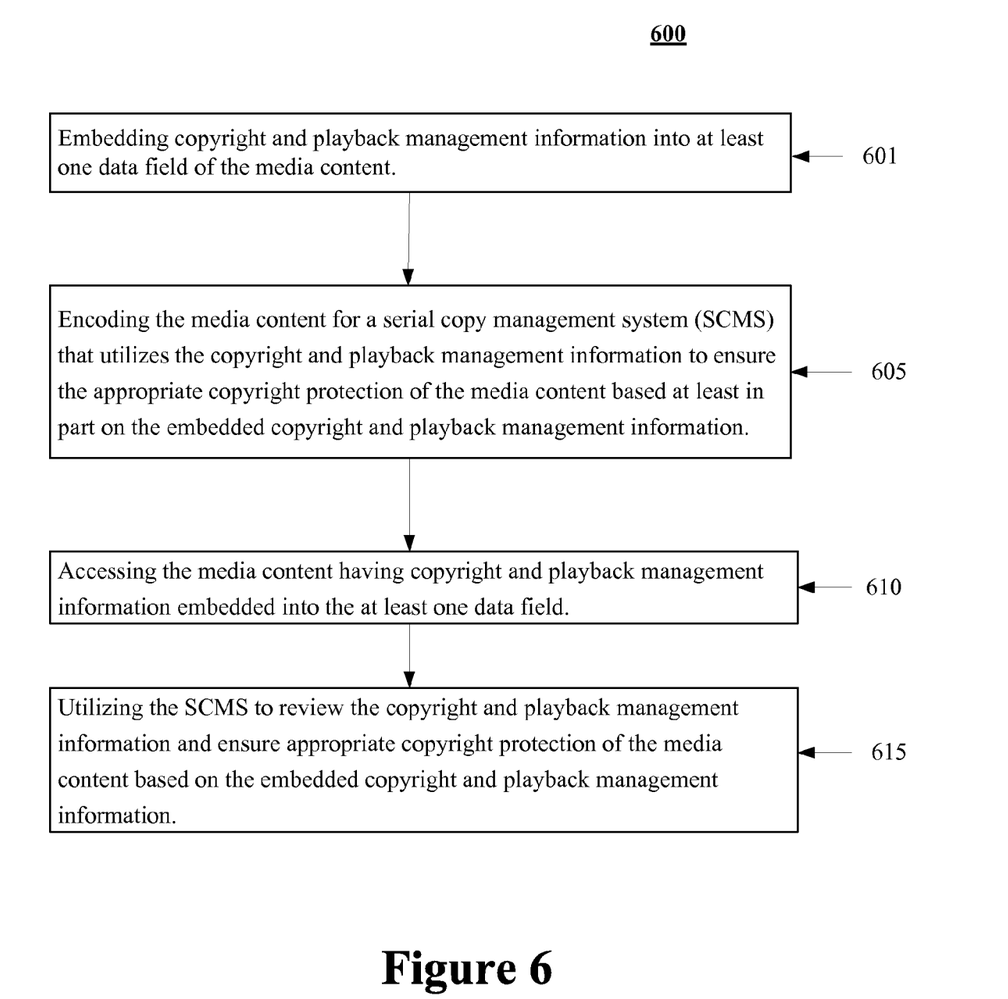
FIG. 6 is a flow chart of a method for utilizing a security thread for protecting copyrighted media content in accordance with an embodiment of the present invention.

With reference now to FIG. 6, a flowchart 600 of a method for utilizing a security thread for protecting copyrighted media content is shown in accordance with one embodiment of the present invention.

With reference now to 601 of FIG. 6, one embodiment embeds copyright and playback management information into at least one data field of the media content. In the following example, the content is not frame based, but instead, it is structured to be HTML compliant, such as, for example, within the confines of the XML framework. For example, the SCMS reader would scan the HTML data of a loading web page and extract out any of the encoded SCMS data. The SCMS reader would then aggregate the information and process it to establish copyright information for the media on the web page.

Referring now to 605 of FIG. 6, one embodiment encodes the media content for a serial copy management system (SCMS) that utilizes the copyright and playback management information to ensure the appropriate copyright protection of the media content based at least in part on the embedded copyright and playback management information.

Example implementations of the SCMS security data could be: a series of tags distributed throughout the entire HTML file; a series of custom tags in a custom XML namespace; a series of CDATA (HTML comments) formatted similar to the formatting of the security thread of the frame based discussion herein, such that they are structured and can be easily detected but then are aggregated to determine what your copy or usage restrictions are for that particular piece of content.

As described herein, one embodiment utilizes the character data (CDATA) construct of the HTML. For example, one embodiment would define a format that would be readily recognizable as SCMS content. For example, the first part of the comment may be "afafMOMI" which would signal that the comment is to be extracted and aggregated by the SCMS reader.

In another embodiment, the browser being used may include the SCMS reader. In one embodiment, such a browser would require a custom tag that included defining a custom XML namespace. In one embodiment, this methodology may provide visibility to the end user, while CDATA is typically ignored by the browser. In general, the customized name space also must be web accessible otherwise the XML parser would not know what to do with the customized tags.

In another embodiment, there may be actual script embedded within the CDATA. However, since the CDATA is user readable, any script may be encrypted, or otherwise modified, such that it is compliant with the character set of XML (for example UTF8, UTF16, ASCI96, etc.). In addition, in one embodiment, any CDATA that includes SCMS data may be stripped after aggregation so that the end user cannot see or access the SCMS CDATA.

For purposes of the present discussion, "encoded in the content" is different than a "re-direct". For example, during a "re-direct", a link is selected and the server looks to see if the user has permission (e.g., a cookie) before the user is allowed to even see the content. If the user does not have the proper permission or cookie, the user is redirected, such as to a login page or the like.

In contrast, the SCMS data "encoded in the content" is acted upon differently in that the user is already at the page (not redirected). For example, during the loading of the page the SCMS data is read and the user is able to see all of the webpage, some of the web page, none of the web page, or the like depending on the SCMS data. In other words, the user is not redirected but is instead presentation of the media content is controlled by the encoded SCMS data acting in conjunction with the user's own machine. In other words, in one embodiment "encoded in the content" refers to a local security measure versus a server or remote security "redirect" measure.

In general, a website has a number of pages where each page is similar to a page of a book. An entire website may include a number of pages such as contact, home, employment, log-in, help, etc. The present technology protects not just the book (e.g., redirect) but each page within the book. For example, a user may be able to access a website and may have SCMS permission to view some pages/content, but may not have SCMS permissions to view other pages/content on a page.

In one embodiment, the present technology does not require encryption, but instead utilizes a generic page and then has the security threads added to the page. Thus, no specific encryption or device is required to view the web information. Instead, the embedded data in conjunction with the SCMS aggregation and guidelines and the CCM will control the download, copy, etc.

Referring now to 610 of FIG. 6, one embodiment accesses the media content having copyright and playback management information embedded into the at least one data field. In one embodiment, the Internet is utilized to deliver the media content broadcasts. In one embodiment, the device accessing the media content may be any type of electronic device capable of presenting the media content 307 such as, but not limited to, a computer system, a portable computing device, a mobile phone, PDA, MP3 player with video rendering capabilities, a television, a presentation device such as a projector, viewer or electronic equipment intrinsically coupled with an audio device such as a tape player, digital player, stereo player, and the like.

With reference now to 615 of FIG. 6, one embodiment utilizes the SCMS to review the copyright and playback management information and ensure appropriate copyright protection of the media content based on the embedded copyright and playback management information.

For example, a user goes to bluebeat.com and navigates to a Celtic music page. The page has photos, a write-up about Celtic music, art and/or media of some kind In one embodiment, the user may be able to view the web page, but would not be allowed to copy or steal the information on the page. Instead, in one embodiment, during an attempt to copy the page, the embedded SCMS data will only allow a copy of the URL to be obtained.

Thus, a user cannot copy the web page. Instead, all the user can copy is the URL or any other information that the SCMS provides such as a "not allowed to copy" statement etc. In another embodiment, the user may be able to copy components of the page, but not all of the information (if different parts of web page have different protection SCMS characteristics). Therefore, in one embodiment the technology herein stops a user from copying or extracting information that the webpage owner does not want copied, but lets a user freely access, copy, and download unprotected content.

In another example, a web blog may want to have the actual blog protected from copying, but the comments may be freely copyable. In this case, the SCMS data will cause the CCM to allow copying of the comments but not of the actual blog writing (the actual author's work).

In one embodiment, if the media content 307 has detectable SCMS information, but the information is either corrupt or internally inconsistent, then the CCM-enabled playback/recording application 205 would not allow presentation of the media content.

Email Discussion

In general, the email protection methodology is similar to above web-page discussion. In other words, a user may be able to receive and view an email, but may not be able to forward, copy, etc. The present technology is well suited, for example, in the sending of confidential email.

One embodiment of the present technology takes advantage of already present characteristics for putting the SCMS information in parts of multi-part form. For example, one embodiment creates a multi-part form (special MIME type) in the header (one of key value pairs) in message. The body would then be a concatenation of a bunch of different documents. The email will also include a separator string that is uniquely identifiable by the client. The separator string is used to separate out each individual part. Each part has a separate header that tells you what type of data it is. In the case of something that is SCMS protected, a custom MIME type would be provided for that purpose. For example, "text/x-SCMS" it would contain encoded data. The SCMS reader (on end user device) would take and aggregate that out, go to the next part and process it, each time it would find the custom MIME type it would aggregate the data and then do whatever it needed to do to determine the rights for that particular email message (e.g., CCM on end user device, remote server, download CCM to view email, etc.)

In so doing, even if email is sent HTML and received non-HTML the SCMS information is transmitted over servers and then downloaded such as via POP3 to a user's device, thus even though the email is not shown with the HTML at the downstream/receiving device, the device would have received the SCMS information and the reader would have been able to parse out the SCMS information related to all or a portion of the email.

Thus, one embodiment provides a generic message for files such that the data can be transmitted without loss of data control, foreign software embedding, or the like while email privacy is maintained.

Example Computing System

Figure 7:
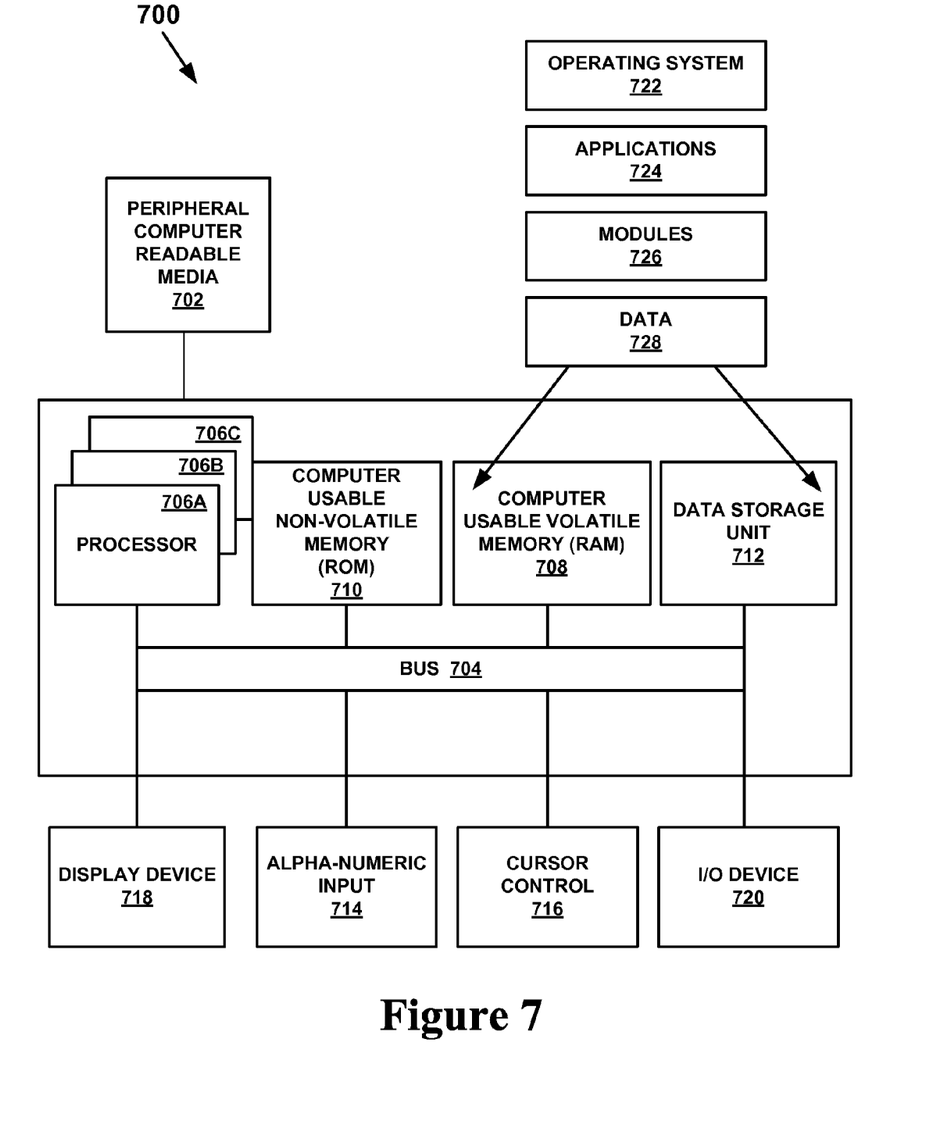
FIG. 7 is a block diagram of an exemplary computer system in accordance with one embodiment of the present invention.

With reference now to FIG. 7, portions of the technology for providing computer-readable and computer-executable instructions that reside, for example, in or on computer-usable media of a computer system. That is, FIG. 7 illustrates one example of a type of computer that can be used to implement one embodiment of the present technology.

Although computer system 700 of FIG. 7 is an example of one embodiment, the present technology is well suited for operation on or with a number of different computer systems including general purpose networked computer systems, embedded computer systems, routers, switches, server devices, user devices, various intermediate devices/artifacts, standalone computer systems, mobile phones, personal data assistants, and the like.

In one embodiment, computer system 700 of FIG. 7 includes peripheral computer readable media 702 such as, for example, a floppy disk, a compact disc, and the like coupled thereto.

Computer system 700 of FIG. 7 also includes an address/data bus 704 for communicating information, and a processor 706A coupled to bus 704 for processing information and instructions. In one embodiment, computer system 700 includes a multi-processor environment in which a plurality of processors 706A, 706B, and 706C are present. Conversely, computer system 700 is also well suited to having a single processor such as, for example, processor 706A. Processors 706A, 706B, and 706C may be any of various types of microprocessors. Computer system 700 also includes data storage features such as a computer usable volatile memory 708, e.g. random access memory (RAM), coupled to bus 704 for storing information and instructions for processors 706A, 706B, and 706C.

Computer system 700 also includes computer usable non-volatile memory 710, e.g. read only memory (ROM), coupled to bus 704 for storing static information and instructions for processors 706A, 706B, and 706C. Also present in computer system 700 is a data storage unit 712 (e.g., a magnetic or optical disk and disk drive) coupled to bus 704 for storing information and instructions. Computer system 700 also includes an optional alpha-numeric input device 714 including alpha-numeric and function keys coupled to bus 704 for communicating information and command selections to processor 706A or processors 706A, 706B, and 706C. Computer system 700 also includes an optional cursor control device 716 coupled to bus 704 for communicating user input information and command selections to processor 706A or processors 706A, 706B, and 706C. In one embodiment, an optional display device 718 is coupled to bus 704 for displaying information.

Referring still to FIG. 7, optional display device 718 of FIG. 7 may be a liquid crystal device, cathode ray tube, plasma display device or other display device suitable for creating graphic images and alpha-numeric characters recognizable to a user. Optional cursor control device 716 allows the computer user to dynamically signal the movement of a visible symbol (cursor) on a display screen of display device 718. Implementations of cursor control device 716 include a trackball, mouse, touch pad, joystick or special keys on alpha-numeric input device 714 capable of signaling movement of a given direction or manner of displacement. Alternatively, in one embodiment, the cursor can be directed and/or activated via input from alpha-numeric input device 714 using special keys and key sequence commands or other means such as, for example, voice commands.

Computer system 700 also includes an I/O device 720 for coupling computer system 700 with external entities. In one embodiment, I/O device 720 is a modem for enabling wired or wireless communications between computer system 700 and an external network such as, but not limited to, the Internet.

Referring still to FIG. 7, various other components are depicted for computer system 700. Specifically, when present, an operating system 722, applications 724, modules 726, and data 728 are shown as typically residing in one or some combination of computer usable volatile memory 708, e.g. random access memory (RAM), and data storage unit 712. However, in an alternate embodiment, operating system 722 may be stored in another location such as on a network or on a flash drive. Further, operating system 722 may be accessed from a remote location via, for example, a coupling to the internet.

In one embodiment, the present technology is stored as an application 724 or module 726 in memory locations within RAM 708 and memory areas within data storage unit 712.

The present technology may be described in the general context of computer-executable instructions stored on computer readable medium that may be executed by a computer. However, one embodiment of the present technology may also utilize a distributed computing environment where tasks are performed remotely by devices linked through a communications network.

Although a number of embodiments have been described in terms of music, aspects described herein may be used for any form of media, such as music, movies, videos, DVDs, CDs, books, documents, graphics, etc.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the Claims.

What is claimed is:

1. A method of computer-executable instructions stored on a non-transitory computer readable medium that may be executed by a computer for utilizing a security thread for protecting copyrighted media content, said method comprising:

embedding copyright and playback management information into at least one data field of said media content;

encoding said media content for a serial copy management system (SCMS) that utilizes said copyright and playback management information to ensure said appropriate copyright protection of said media content based at least in part on said embedded copyright and playback management information; and embedding a presentation command to said SCMS to allow presenting of said media content only with a copyright compliance mechanism (CCM)-enabled playback/recording/recording application, said CCM-enabled playback/recording application utilizing a new pathway distinct from a commonly used data pathway of a media content rendering subsystem of an operating system, such that said media content continuously remains in a secure environment during rendering, playback and recording.

2. The method of claim 1, further comprising:
embedding copyright and playback management information into at least one data field of said media content on a web-page.

3. The method of claim 1, further comprising:
embedding copyright and playback management information into at least one data field of said media content in an e-mail message.

4. The method of claim 1, wherein said embedding comprises:
parsing said copyright and playback management information into a plurality of segments; and
embedding said copyright and playback management information segments into a plurality of comment data (CDATA) tags.

5. The method of claim 4, further comprising:
embedding a strip command directing said SCMS to strip any CDATA that includes said copyright and playback management information segments prior to providing access to said media content.

6. The method of claim 1, wherein said embedding comprises:
parsing said copyright and playback management information into a plurality of segments; and
embedding said copyright and playback management information segments into a series of custom tags in a custom XML namespace.

7. The method of claim 1, wherein said embedding comprises:
parsing said copyright and playback management information into a plurality of segments; and
embedding said copyright and playback management information segments as a script within a plurality of comment data (CDATA) tags.

8. The method of claim 1 further comprising:
embedding an automatic download and install command to said SCMS to download and install said CCM to said computing device if no said CCM is present at said computing device.

9. The method of claim 8 further comprising:
embedding a remote server command to said SCMS to access a remote server having said CCM thereon if no said CCM is present at said computing device.

10. The method of claim 1, wherein said embedding copyright and playback management information further comprises embedding information selected from the group consisting of: a version number of said media content, a no copying allowed for said media content, a number of copies allowed for said media content, and a number of plays allowed for said media content.

11. A method of computer-executable instructions stored on computer readable device that may be executed by a computer for utilizing a security thread for protecting copyrighted media content, said method comprising:

accessing media content having copyright and playback management information embedded into at least one data field thereof;
utilizing a serial copy management system (SCMS) to review said copyright and playback management information and ensure appropriate copyright protection of said media content based on said embedded copyright and playback management information; and
presenting said media content with a copyright compliance mechanism (CCM)-enabled playback/recording/recording application, said CCM-enabled playback/recording application utilizing a new pathway distinct from a commonly used data pathway of a media content rendering subsystem of an operating system, such that said media content continuously remains in a secure environment during rendering, playback and recording.

12. The method of claim 11, further comprising:
accessing said media content at a web-page.

13. The method of claim 11, further comprising:
accessing said media content in an e-mail message.

14. The method of claim 11, further comprising:
accessing media content having copyright and playback management information embedded in segments in a plurality of comment data (CDATA) tags; and
aggregating the segments of said copyright and playback management information at said SCMS.

15. The method of claim 14, further comprising:
utilizing said SCMS to strip any CDATA that includes said copyright and playback management information segments after said aggregating.

16. The method of claim 11, wherein said embedding comprises:
accessing media content having copyright and playback management information embedded in segments in a series of custom tags in a custom XML namespace; and
aggregating the segments of said copyright and playback management information at said SCMS.

17. The method of claim 11, wherein said embedding comprises:
accessing media content having copyright and playback management information embedded in segments as a script within a plurality of comment data (CDATA) tags; and
aggregating the segments of said copyright and playback management information to provide a complete script at said SCMS.

18. The method of claim 11 further comprising:
automatically downloading and installing said CCM to said computing device if said CCM is not present at said computing device.

19. The method of claim 11 further comprising:
automatically accessing a remote server having said CCM thereon if said CCM is not present at said computing device.

20. The method of claim 11 further comprising:
accessing said media content from a compact disk (CD).

21. The method of claim 11 further comprising:
accessing said media content from a digital versatile disk (DVD).

* * * * *